US010836876B2

(12) United States Patent
Abele et al.

(10) Patent No.: US 10,836,876 B2
(45) Date of Patent: Nov. 17, 2020

(54) LATEX BONDED TEXTILE FIBER STRUCTURE FOR CONSTRUCTION APPLICATIONS

(71) Applicant: Synthomer Deutschland GmbH, Marl (DE)

(72) Inventors: Alexandra Abele, Dülmen (DE); Sören Butz, Dülmen (DE); Martin Driever, Düsseldorf (DE); Andreas Gehr, Mülheim a.M. (DE); Michael Karnop, Recklinghausen (DE); Peter Ludwig, Dorsten (DE)

(73) Assignee: Synthomer Deutschland GmbH (DE)

( * ) Notice: Subject to any disclaimer, the term of this patent is extended or adjusted under 35 U.S.C. 154(b) by 79 days.

(21) Appl. No.: 16/284,864

(22) Filed: Feb. 25, 2019

(65) Prior Publication Data
US 2019/0263983 A1 Aug. 29, 2019

(30) Foreign Application Priority Data
Feb. 27, 2018 (EP) .................................... 18158774

(51) Int. Cl.
*C08L 9/08* (2006.01)
*D06N 5/00* (2006.01)
*C08J 5/04* (2006.01)
*C08J 5/08* (2006.01)
*C03C 25/27* (2018.01)
*D04H 1/587* (2012.01)
*E04B 1/66* (2006.01)
*D04H 1/64* (2012.01)
*D06N 3/10* (2006.01)
*E04D 5/02* (2006.01)
*E04D 5/06* (2006.01)

(52) U.S. Cl.
CPC .............. *C08J 5/046* (2013.01); *C03C 25/27* (2018.01); *C08J 5/043* (2013.01); *C08J 5/08* (2013.01); *C08L 9/08* (2013.01); *D04H 1/587* (2013.01); *D04H 1/64* (2013.01); *D06N 3/103* (2013.01); *D06N 5/00* (2013.01); *E04B 1/665* (2013.01); *C08J 2309/08* (2013.01); *C08J 2467/00* (2013.01); *C08L 2205/16* (2013.01); *D04H 1/641* (2013.01); *D06N 2211/06* (2013.01); *D06N 2211/063* (2013.01); *E04D 5/02* (2013.01); *E04D 5/06* (2013.01)

(58) Field of Classification Search
None
See application file for complete search history.

(56) References Cited

U.S. PATENT DOCUMENTS

| | | | |
|---|---|---|---|
| 3,563,946 A | 2/1971 | Miller et al. | |
| 3,575,913 A | 4/1971 | Meier | |
| 4,472,086 A | 9/1984 | Leach | |
| 4,478,974 A | 10/1984 | Lee et al. | |
| 4,504,539 A | 3/1985 | Petracek et al. | |
| 4,593,068 A * | 6/1986 | Hirose | C08F 290/062 428/447 |
| 4,751,111 A | 6/1988 | Lee et al. | |
| 4,968,740 A | 11/1990 | Makati et al. | |
| 5,470,930 A * | 11/1995 | Toba | C08F 4/30 526/204 |
| 6,313,253 B1 | 11/2001 | Baumann et al. | |
| 6,407,146 B1 * | 6/2002 | Fujita | C08F 8/42 522/100 |
| 6,479,584 B1 * | 11/2002 | Nakagawa | C08L 53/005 525/100 |
| 6,693,146 B2 * | 2/2004 | Mueller | D04H 1/435 524/526 |
| 2009/0136774 A1 * | 5/2009 | Onogi | C08L 23/12 428/516 |
| 2011/0214796 A1 * | 9/2011 | Avramidis | C09J 109/06 156/71 |
| 2011/0223402 A1 * | 9/2011 | Gamert | C08L 3/02 428/219 |
| 2012/0202082 A1 * | 8/2012 | Fujii | C08G 18/0866 428/474.4 |
| 2012/0208035 A1 * | 8/2012 | Iwamoto | C09D 5/38 428/457 |
| 2013/0004769 A1 * | 1/2013 | Okamoto | C09J 7/385 428/355 CN |
| 2015/0111026 A1 * | 4/2015 | Azuma | C09D 167/02 428/327 |
| 2016/0333219 A1 * | 11/2016 | Kanda | C08G 18/6229 |
| 2018/0237662 A1 * | 8/2018 | Widenbrant | B32B 5/026 |

FOREIGN PATENT DOCUMENTS

| | | |
|---|---|---|
| EP | 160609 | 11/1985 |
| EP | 176847 | 4/1986 |
| EP | 0281643 | 9/1988 |
| EP | 333602 | 9/1989 |
| EP | 395548 | 10/1990 |
| EP | 1114849 | 7/2001 |
| EP | 2231917 | 5/2016 |
| GB | 1517595 | 7/1978 |
| WO | 0242344 | 5/2002 |
| WO | 2007024683 | 3/2007 |
| WO | 2008008868 | 1/2008 |
| WO | 2008150647 | 12/2008 |
| WO | 2010019338 | 2/2010 |
| WO | 2016193646 | 12/2016 |
| WO | 2017164726 | 9/2017 |

* cited by examiner

*Primary Examiner* — Peter A Salamon
(74) *Attorney, Agent, or Firm* — Tumey L.L.P.

(57) ABSTRACT

The present invention relates to a textile fiber structure comprising man-made fibers fortified by a binder comprising a polymer latex obtained from the emulsion polymerization in aqueous medium of a mixture of ethylenically unsaturated monomers comprising:
(a) an aliphatic conjugated diene
(b) a vinyl aromatic compound;
(c) an ethylenically unsaturated silane bearing at least one silicon bonded hydrolysable group, and
(d) an ethylenically unsaturated acid
and to its use in construction applications, and to the use of the above binder to fortify textile fiber structures.

20 Claims, No Drawings

LATEX BONDED TEXTILE FIBER STRUCTURE FOR CONSTRUCTION APPLICATIONS

The present invention relates to a fiber structure comprising man-made fibers fortified by a binder comprising a polymer latex and its use in construction applications as well as to the use of said binder to fortify a fiber structure.

BACKGROUND OF THE INVENTION

Binder fortified fiber structures are commonly used in construction applications. One example is for use in roofing felts that comprise a fiber structure often made from organic polymer fibers. Frequently the fiber structure is a non-woven structure of polyester fibers, which for the desired application as a roofing felt the non-woven structure needs to be fortified by a binder. According to a commonly used approach in industry the binder is a two component system (2K), wherein one component comprises a polymer latex and the second component a cross-linking resin for example an aminoplast resin such as a urea formaldehyde resin or melamine formaldehyde resin. Both components are combined immediately prior to application to the fiber structure and the coated fiber structure is subsequently heat cured to provide the roofing felts.

Another example where binder fortified fiber structures are used in construction applications are exterior insulation finishing systems (EIFS). The fiber structure for this application is commonly a woven glass fiber structure. According to one approach frequently used in industry the binder used to fortify the fiber structure comprises a polymer latex made from a monomer composition that contains self-crosslinking monomers for example N-methylolamide functional ethylenically unsaturated monomers. After application of the binder the fiber structure is heat cured to provide the desired mechanical strength and alkali resistance for the application in exterior insulation finishing systems.

Both examples have in common that upon curing of the binder formaldehyde is released. Aminoplast resins as well as self-crosslinking N-methylolamide groups emit formaldehyde upon curing. Formaldehyde recently came under scrutiny by governmental organizations as being a potentially carcinogenic compound and might be classified as a hazardous compound. Thus, there is a need in industry for binders to be used to fortify fiber structures that do not release formaldehyde upon curing.

WO 2008/008868 describes a fiber mat for building applications that is bonded by a binder comprising a formaldehyde free resin and a functional silane additive which is not part of the resin. Particularly, a binder is disclosed that comprises a styrene acrylate dispersion in combination with a polyol cross-linker and an aminosilane additive.

US 2011/0214796 relates to an adhesive comprising a styrene butadiene based aqueous dispersion and an epoxysilane. The styrene butadiene latex may comprise structural units from additional monomers such as ethylenically unsaturated silane monomers. Other suitable comoners include N-methylol (meth)acrylamide. But there is no disclosure of the use of that adhesive as binder to fortify a fiber structure or of binder fortified fiber structures.

WO 2008/150647 relates to fiber mats for building applications that are bonded by an aqueous binder composition comprising a urea formaldehyde resin and a polymer latex prepared from a monomer mixture comprising styrene, alkyl(meth)acrylate, acrylonitrile and an acrylamide. Due to the presence of the urea formaldehyde resin the binder will emit formaldehyde upon heat curing.

WO 2010/019338 discloses glass fiber mats bonded by a binder composition comprising a formaldehyde free binder that may be selected from an acrylic polyol, starch grafted styrene or acrylic modified polyvinyl acetate and a reactive hydrophobic additive such as stearyl acrylates, stearyl melamines, epoxidized fatty acid based oils and epoxy silanes.

WO 2016/193646 describes a binder composition for impregnating a glass fiber fabric comprising a silylated acrylic polymer obtained by copolymerizing alkyl(meth)acrylates and an ethylenically unsaturated silane monomer. Neither conjugated dienes nor vinyl aromatic compounds are mentioned as suitable comonomers. Thus, the latex polymer is restricted to purely (meth)acrylic polymers.

EP 1114849 relates to a polymer latex obtained by aqueous emulsion polymerization of a monomer mixture comprising conjugated dienes, vinyl aromatic compounds, ethylenically unsaturated carboxylic acids and a co-polymerizable self-crosslinking monomer selected from N-methylol(meth)acrylates). This latex is used as binder for fabrics in particular organic polymer fiber non-wovens to be used as bitumen impregnated roofing felts. The coated fiber structure exhibits excellent high temperature dimension stability as is required for the bitumen impregnation process and high temperature processing of the resulting roof sheeting.

WO 02/42344 discloses an aqueous dispersion of a core shell acrylic polymer obtained from one or more acrylic monomers whose corresponding homopolymer has a glass transition temperature (Tg) of less than 0° C., one or more acrylic monomers whose corresponding homopoylmer has a Tg of more than 0° C., one or more monomers containing at least two ethylenic unsaturations, vinyl alkoxy silanes, and ethylenically unsaturated carboxylic acids. The aqueous dispersion can be used for the impregnation of textiles. Construction application is nowhere mentioned.

WO 2007/024683 describes a wet-laid chopped strand glass mat for use in roofing applications formed by the application or inclusion of at least one coupling agent for example as part of a two part binder composition that includes the coupling agent. Preferred two part binders include the combination of a urea formaldehyde binder and a styrene butadiene binder. Preferred coupling agents are silanes and reactive siloxanes.

Thus, it is an object of the present invention to provide a binder composition to fortify a textile fiber structure that does not emit formaldehyde upon curing without compromising the required properties of the fortified fiber structure or to even improve the properties, such as high temperature dimensional stability or alkali resistance. Furthermore, it is an object of the present invention to provide a binder composition that allows for lower curing temperatures and shorter curing times in the preparation of the binder fortified textile fiber structure in order to reduce energy consumption and increase throughput of an existing production line, without compromising the required properties of the fortified fiber structure.

SUMMARY OF THE INVENTION

These objects have been surprisingly attained by a textile fiber structure useful for construction applications comprising man-made fibers fortified by a binder comprising a polymer latex obtained from the emulsion polymerization in aqueous medium of a mixture of ethylenically unsaturated monomers comprising:
(a) an aliphatic conjugated diene
(b) a vinyl aromatic compound; and
(c) an ethylenically unsaturated silane bearing at least one silicon bonded hydrolysable group.

According to a further aspect the present invention relates to the use of a binder comprising a polymer latex obtained from the emulsion polymerization in aqueous medium of a mixture of ethylenically unsaturated monomers comprising:
(a) an aliphatic conjugated diene
(b) a vinyl aromatic compound; and
(c) an ethylenically unsaturated silane bearing at least one silicon bonded hydrolysable group
to fortify textile fiber structures.

It is still a further aspect of the present invention to use the textile fiber structures according to the present invention in construction applications.

DETAILED DESCRIPTION OF THE INVENTION

The present invention will now be described in more detail.

Binder:

The binder of the present invention comprises a polymer latex obtained from the emulsion polymerization in aqueous medium of a mixture of ethylenically unsaturated monomers comprising:
(a) an aliphatic conjugated diene
(b) a vinyl aromatic compound; and
(c) an ethylenically unsaturated silane bearing at least one silicon bonded hydrolysable group.

Due to the presence of the ethylenically unsaturated silane bearing at least one silicon bonded hydrolysable group the binder has self-crosslinking properties, whereby upon crosslinking no hazardous components such as formaldehyde will be emitted. Suitable silicon bonded hydrolysable groups according to the present invention may be alkoxy groups, acyloxy groups, halogen groups or combinations thereof. Preferred hydrolysable groups are alkoxy groups, in particular methoxy and ethoxy groups.

Thus, suitable ethylenically unsaturated silanes bearing at least one silicon bonded hydrolysable group according to the present invention may be selected from γ-(meth)acryloxypropyl trimethoxysilane, γ-(meth)acryloxypropyl triethoxysilane, γ-methacryloxypropyl methyldimethoxysilane, γ-(meth)acryloxypropyl dimethylmethoxysilane, γ-(meth)acryloxypropyl methyldiethoxysilane, γ-(meth)acryloxypropyl dimethylethoxysilane, 3-(N-allylamino)propyl trimethoxysilane, allyltrimethoxysilane, allyltriethoxysilane, 3-aminophenoxydimethylvinylsilane, 4-aminophenoxydimethylvinylsilane, 3-(3-aminopropoxy)-3,3-dimethyl-1-propenyl trimethoxysilane, butenyltriethoxysilane, butenyltrimethoxysilane, 2-(chloromethyl)ally trimethoxysilane, decosenyltriethoxysilane, (meth)acryloxyethoxy trimethoxysilane, (meth)acryloxyethoxy triethoxysilane, (meth)acryloxyethoxy methyldimethoxysilane, (meth)acryloxyethoxy methyldiethoxysilane, (meth)acryloxymethyl trimethoxysilane, (meth)acryloxymethyl methyldimethoxysilane, (meth)acryloxymethyl triethoxysilane, (meth)acryloxymethyl methyldiethoxysilane, γ-(meth)acryloxypropyl tris(methoxyethoxy)silane, 7-octenyl trimethxysilane, 7-octenyl triethxysilane, allylmethyldimethoxysilane, vinyltrimethoxysilane, vinyltriethoxysilane, vinylmethyldimethoxysilane, vinylmethyldimethoxysilane, vinyl dimethylethoxysilane, vinyl dimethylmethoxysilane, vinyltriacetoxysilane, vinylmethyl diacetoxasilane, and combinations thereof.

Particularly suitable ethylenically unsaturated silanes bearing at least one silicon bonded hydrolysable group are selected from γ-(meth)acryloxypropyl trimethoxysilane, γ-(meth)acryloxypropyl triethoxysilane, γ-(meth)acryloxypropyl methyldimethoxysilane, γ-(meth)acryloxypropyl dimethylmethoxysilane, 3-(N-allylamino)propyl trimethoxysilane, allyltrimethoxysilane, allyltriethoxysilane, allylmethyldimethoxysilane, vinyltrimethoxysilane, vinyltriethoxysilane, vinylmethyldimethoxysilane and combinations thereof. γ-methacryloxypropyl trimethoxysilane is particularly preferred.

According to the present invention the mixture of ethylenically unsaturated monomers may comprise:
(a) 20 to 60 wt.-% of at least one aliphatic conjugated diene;
(b) 30 to 70 wt.-% of at least one aromatic vinyl compound;
(c) 0.5 to 5 wt.-% of at least one ethylenically unsaturated silane bearing at least one silicon bonded hydrolysable group;
(d) 0.1 to 8 wt.-% of at least one ethylenically unsaturated acid; and
(e) 0 to 20 wt.-% of at least one further ethylenically unsaturated compound different from any of compounds (a) to (d),
the weight percentages being based on the total amount of monomers and add up to 100 wt.-%.

Particularly, the mixture of ethylenically unsaturated monomers may comprise:
(a) 25 to 45 wt.-% of at least one aliphatic conjugated diene;
(b) 50 to 65 wt.-% of at least one aromatic vinyl compound;
(c) 0.5 to 5 wt.-% of at least one ethylenically unsaturated silane bearing at least one silicon bonded hydrolysable group;
(d) 0.1 to 7 wt.-% of at least one ethylenically unsaturated acid; and
(e) 0 to 20 wt.-% of at least one further ethylenically unsaturated compound different from any of compounds (a) to (d).

Conjugated diene monomers suitable for the preparation of the latices according to the present invention include conjugated diene monomers, selected from 1,3-butadiene, isoprene and 2,3-dimethyl-1,3-butadiene. 1,3-butadiene is the preferred conjugated diene according to the present invention. Typically, the amount of conjugated diene monomer ranges from 20 to 60 wt.-%, preferably from 20 to 50 wt.-%, more preferred from 25 to 45 wt.-%, and most preferred from 30 to 40 wt.-%, based on the total weight of monomers. Thus, the conjugated diene may be present in amounts of at least 20 wt.-%, at least 22, wt.-%, at least 24 wt.-%, at least 26 wt.-%, at least 28 wt.-%, or at least 30, wt.-%, based on the total weight of the ethylenically unsaturated monomers.

Accordingly, the conjugated diene monomers can be used in amounts of no more than 60 wt.-%, no more than 58 wt.-%, no more than 56 wt.-%, no more than 54 wt.-%, no more than 52 wt.-%, no more than 50 wt.-%, no more than 48 wt.-%, no more than 46 wt.-%, no more than 44 wt.-% no more than 42 wt.-%, or no more than 40 wt.-%.

A person skilled in the art will appreciate that any range between any of the explicitly disclosed lower and upper limit is herein disclosed.

Representative examples of vinyl-aromatic monomers include, styrene, α-methylstyrene, p-methylstyrene, t-butylstyrene and 2-vinyltoluene. Mixtures of one or more of the vinyl-aromatic compounds may also be used. The preferred monomers are styrene and α-methylstyrene. The vinyl-aromatic compounds can be used in a range of from 30 to 70 wt.-%, preferably from 50 to 65 wt.-%, or from 50 to 60 wt.-%, based on the total weight of ethylenically unsaturated monomers. Thus, the vinyl-aromatic compound can be present in an amount of at least 30 wt.-%, at least 32 wt.-%, at least 34 wt.-%, at least 36 wt.-%, at least 38 wt.-%, at least 40 wt.-%, at least 42 wt.-%, at least 44 wt.-%, at least 46 wt.-%, at least 48 wt.-%, or at least 50 wt.-%. Likewise, the vinyl-aromatic compounds can be present in an amount of no more than 70 wt.-%, no more than 68 wt.-%, no more than 66 wt.-%, no more than 64 wt.-%, no more than 62 wt.-%, or no more than 60 wt.-% based on the total weight of ethylenically unsaturated monomers. A person skilled in the art will appreciate that any range between one of the explicitly disclosed lower limits and upper limits is disclosed herein.

Typically, the amount of the ethylenically unsaturated silane bearing at least one silicon bonded hydrolysable group is 0.5 to 5 wt.-%, preferably 0.5 to 4.5 wt.-%, more preferred 1 wt.-% to 4 wt.-%, even more preferred 1 wt.-% to 3.5 wt.-% or 1.0 wt.-% to 3 wt.-% based on the total amount of monomers. Thus, ethylenically unsaturated silane bearing at least one silicon bonded hydrolysable group can be present in an amount of at least 0.5 wt.-%, at least 1.0 wt.-%, at least 1.5 wt.-%, or at least 2.0 wt.-%. Likewise, the ethylenically unsaturated silane bearing at least one silicon bonded hydrolysable group can be present in an amount of no more than 5 wt.-%, no more than 4.5 wt.-%, no more than 4.0 wt.-%, no more than 3.5 wt.-%, no more than 3.0 wt.-%, based on the total weight of ethylenically unsaturated monomers. A person skilled in the art will appreciate that any range between one of the explicitly disclosed lower limits and upper limits is disclosed herein.

The monomer mixture for the preparation of the polymer latex to be used according to the present invention may comprise additional monomers that are co-polymerizable with the above described mandatory monomers. One suitable class of optional co-monomers are ethylenically unsaturated acids (d).

The ethylenically unsaturated carboxylic acid monomers suitable for use in the present invention include monocarboxylic acid and dicarboxylic acid monomers and monoesters of dicarboxylic acid. Carrying out the present invention it is preferable to use ethylenically unsaturated aliphatic mono- or dicarboxylic acids or anhydrides which contain from 3 to 5 carbon atoms. Examples of monocarboxylic acid monomers include an acrylic acid, methacrylic acid, crotonic acid and examples of dicarboxylic acid monomers include fumaric acid, itaconic acid, maleic acid and maleic anhydride. Examples of other suitable ethylenically unsaturated acids include vinyl acetic acid, vinyl lactic acid, vinyl sulfonic acid, 2-Methyl-2-propene-1-sulfonic acid, styrene sulfonic acid, acrylamidomethyl propane sulfonic acid and the salts thereof The use of ethylenically unsaturated acid monomers influences the properties of the polymer dispersion and of the coating produced thereof. The type and the amount of these monomers are determined thereby. Typically, such an amount is from 0.1 to 8 wt.-%, preferably from 1 to 8 wt.-%, more preferred from 1 to 7 wt.-%, even more preferred from 1 to 6 wt.-% or from 1 to 5 wt.-% based on the total weight of the ethylenically unsaturated monomers. Thus, the ethylenically unsaturated acid monomers may be present in amounts of at least 0.1 wt.-%, at least 0.3 wt.-%, at least 0.5 wt.-%, at least 0.7 wt.-%, at least 0.9 wt.-%, at least 1 wt.-%, at least 1.2 wt.-%, at least 1.4 wt.-%, at least 1.6 wt.-%, at least 1.8 wt.-%, at least 2 wt.-%. Likewise, the ethylenically unsaturated acid monomers may be present in amounts of no more than 8 wt.-%, no more than 7.5 wt.-%, no more than 7 wt.-%, no more than 6.5 wt.-%, or no more than 6 wt.-% no more than 5.5 wt.-%, no more than 5 wt.-%, or no more than 4.5 wt.-%, based on the total weight of ethylenically unsaturated monomers. A person skilled in the art will appreciate that any range defined by an explicitly disclosed lower limit and an explicitly disclosed upper limit is disclosed herewith.

Optionally, the ethylenically unsaturated monomer used in the free-radical emulsion polymerization to form the polymer latex to be used according to the present invention may include additional ethylenically unsaturated monomers that are different from the above-defined monomers a) to d). These monomers may be selected from alkylesters or hydroxy alkyl esters of (meth)acrylic acid, vinyl esters, unsaturated nitriles and amides of ethylenically unsaturated acids.

Nitrile monomers which can be used in the present invention include polymerizable unsaturated aliphatic nitrile monomers which contain from 2 to 4 carbon atoms in a linear or branched arrangement, which may be substituted either by acetyl or additional nitrile groups. Such nitrile monomers include acrylonitrile, methacrylonitrile and fumaronitrile, with acrylonitrile being most preferred. These nitrile monomers can be included in amounts of up to 20 wt.-%, preferably from 0.5 to 15 wt.-%, and more preferred from 1 to 12 wt.-%, even more preferred from 1 to 12 wt.-% based on the total weight of ethylenically unsaturated monomers.

Vinyl ester monomers which can be used according to the present invention include vinyl acetate, vinyl proprionate, vinyl butyrate, vinyl benzoate, vinyl-2-ethylhexanoate, vinyl stearate, and the vinyl esters of versatic acid. The most preferred vinyl ester monomers for use in the present invention is vinyl acetate. Typically, the amount of vinyl ester monomers that may be present in the emulsion polymerization for making the polymer latex according to the present invention ranges from 0 to 20 wt.-%, preferably from 0 to 15 wt.-%, more preferred 0 to 10 wt.-% or 0 to 5 wt.-% based on the total weight of ethylenically unsaturated monomers.

Esters of (meth)acrylic acid that can be used according to the present invention include n-alkyl esters, iso-alkyl esters or tert-alkyl esters of acrylic or (meth)acrylic acid in which the alkyl group has from 1 to 20 carbon atoms, the reaction product of methacrylic acid with glycidyl ester of a neoacid such as versatic acid, neodecanoic acid or pyvalic acid and hydroxyalkyl (meth)acrylate and alkoxyalkyl (meth)acrylate monomers.

In general, the preferred alkyl esters of (meth)acrylic acids may be selected from $C_1$-$C_{10}$ alkyl (meth)acrylate, preferably $C_1$-$C_{10}$-alkyl (meth)acrylates. Examples of such acrylate monomers include n-butyl acrylate, secondary butyl acrylate, ethyl acrylate, hexyl acrylate, tert-butyl acrylate, 2-ethylhexyl acrylate, isooctyl acrylate, 4-methyl-2-pentyl acrylate, 2-methylbutyl acrylate, methyl methacrylate, butyl methacrylate, n-butyl methacrylate, isobutyl methacrylate, ethyl methacrylate, isopropyl methacrylate, hexyl methacrylate, cyclohexyl methacrylate and cetyl methacrylate. Typically, the amount of alkyl (meth)acrylate monomers which are present in the polymeric phase depends on the monomer chosen, but is typically in the range of 0 to 20 wt.-%, preferably from 0 to 15 wt.-%, more preferred from 0 to 10 wt.-%, even more preferred 0 to 8 wt.-% or 0 to 5 wt.-%. based on the total amount of ethylenically unsaturated monomers. Lower limits for the content of alkyl esters of (meth)acrylic acids may be 0.5 wt.-%, or 1.0 wt.-%, or 1.5 wt.-% or 2.0 wt.-%. It is most preferred if the monomer composition does not contain alkyl esters of (meth)acrylic acids.

The hydroxy alkyl(meth)acrylate monomers which can be used to prepare the polymer latex according to the present invention include hydroxyalkyl acrylate and methacrylate monomers which are based on ethylene oxide, propylene oxide and higher alkylene oxides or mixtures thereof. Examples are hydroxyethyl acrylate, hydroxypropyl acrylate, hydroxyethyl methacrylate, hydroxypropyl methacrylate and hydroxybutyl acrylate. Typically, the amount of hydroxy alkyl (meth)acrylate monomer present in the polymeric phase depends on the monomer chosen, but the typical range is from 0 to 15 wt.-%, preferably from 0 to 10 wt.-%, based on the total weight of ethylenically unsaturated monomers. It is most preferred if the monomer composition does not contain hydroxy alkyl(meth)acrylate monomers.

Alkoxyalkyl (meth)acrylate monomers which can be used in the present invention include methoxyethyl methacrylate, ethoxyethyl methacrylate, methoxyethyl methacrylate, ethoxyethyl acrylate, butoxyethyl methacrylate, methoxybutyl acrylate and methoxyethoxyethyl acrylate. Preferred alkoxyalkyl(meth)acrylate monomers are ethoxyethyl acrylate and methoxyethyl acrylate. Typically, the amount of alkoxyethyl alkyl (meth)acrylate monomers which is present in the polymeric phase depends on the monomer chosen, but the typical range is from 0 to 15 wt.-%, preferably from 0 to 10 wt.-%, based on the total weight of ethylenically unsaturated monomers. It is most preferred if the monomer composition does not contain alkoxyalkyl (meth)acrylate monomers.

Amides of ethylenically unsaturated acids that can be used for the preparation of the polymer latex to be used according to the present invention include acrylamide, methacrylamide, and diacetone acrylamide. The preferred amide monomer is methacrylamide and acrylamide. Typically, the amount of amides of ethylenically unsaturated acid is in the range of from 0 to 10 wt.-%, preferably from 0.5 to 5 wt.-%, even more preferred 0.5 to 4 wt.-% or 1 to 3.5 wt.-% most preferred from 1 to 3 wt.-%, based on the total weight of ethylenically unsaturated monomers.

The man-made fibers may have a ratio of the longest measurable dimension to the shortest measurable dimension to be more than 5:1. Preferably the man-made fibers of this invention have a ratio of 10:1, more preferably above 20:1, more preferably above 50:1. Thus, coatings and adhesives for agglomerating particles which approach sphericity are not within the scope of the present invention. In one embodiment where the textile fibers are present as a woven mesh, with binder applied at the cross-over points, the preferred ratio for an individual man-made fiber may be significantly larger than 500:1.

According to the present invention the longest dimension is preferably over 100 nm in length, more preferred still over 200 nm in length, more preferred still over 500 nm in length, more preferred still over 1 micron in length. The coating and curing of nano-rod materials is not a preferred embodiment.

According to the present invention the man-made fiber may comprise an organic polymer man-made fiber, which may include polyester, such as hydroxy functionalized polyester or polyethylene terephthalate, polyetherester, polyurethane, polybutylene terephthalate, hydroxyl functionalized polyolefins such as (meth)acrylic acid-g-propylene, polyvinyl alcohol or it's acetals or ketals, nylon 6, nylon 66, polyethylene, polypropylene, poly arylene sulphide, polyether ether ketone, graphitic carbon, particularly activated fibrous carbon, glassy carbon fiber, graphite-epoxy blends, fullerne type carbon, acrylic fibers, modacrylic fibers, aramid or kevlar fibers, nomex fibers, spandex fibers, poly acrylonitrile, chemically modified polycarbonate fibers, chemically treated vinylidene fibers, chemically treated vinyon or saran PVC fibers, artificial polyisoprene or combinations thereof.

Artificial versions of natural fibers; including artificial cellulose fibers, artificial cellulose acetate, artificial cellulose triacetate, artificial alginate fibers, polylactone fibers, polycasein fibers, polyglobulin fibers, polyurea, polylactide fibers, or artificial fibers produced by polymerizing polypeptides, amino acids to produce carboxamide linkages fall also within the term man-made fibers according to the present invention.

Suitable inorganic man-made fiber according to the present invention may include mineral man-made in-organic fibers such as ceramic fibers, basalt fiber, asbestos fiber, slag wool, stone wool, refractory ceramic fibers such as kaowool.

According to the present invention the man-made fiber preferably comprises polyester, preferably hydroxy-functionalised polyester or fiber-glass. Preferred examples of fiber glasses are alkali earth silicate wool, with CaO and MgO additives, particularly preferred are E-Glass, containing additional Alumina, and alkali-resistant or AR-Glass, containing Zirconia and $Na_2O$ instead of CaO. Less preferred fiber glasses are C-glass, A-glass, borosilicate D-glass, E-CR-glass, R-glass, S-glass quartz and S-2-Glass. The fibers can be amorphous or crystalline. Where the man-made fibers are fiber-glass it is preferred if the amount of silica is more than 40 wt.-%, more preferred more than 50 wt.-%, most preferred more than 55 wt.-% silica. Where the man-made fibers comprise hydroxy functionalized polyester the amount of hydroxy functionalized polyester is preferably more than 70 wt.-% polyester, more preferred more than 80 wt.-% and most preferred more than 90 wt.-%.

Although it is outside of the scope of the present invention, the skilled person will appreciate that the binders described herein can be used to treat natural fibers which have been purified, chemically or thermally treated, or treated as produced. For example sisal fibers, hemp fibers, Solka-Floc® Powdered Cellulose, cellulose xanthate, or any viscose process treatment of natural fibers, or side product thereof for example lignin fibers, or any product resulting from treating fiber containing biomass with pulp liquors, or saponified acetate process. Unmodified natural fibers such as silk, cotton or jute fiber can be cured with the binder. Alternately the binder may cure animal by-product based fibers such as collagen or keratin. Particularly fibers presenting hydroxyl functionalities and/or carboxy functionalities can yield green strength with addition of bivalent metal ions, otherwise chemical modification may be required.

Or one or more of the any of the above organic man-made fibers, artificial versions of natural fibers or inorganic man-made fiber, may be present as a blend fiber.

Alternatively or additionally it is possible to apply the binder to the fibers at their terminal end in order to set them into a thermally stable substrate in a "carpet-like configuration" then curing the binder to create a surface of long free-flowing fiberous material, extending perpendicularly from the substrate on one or both sides of the substrate.

Alternatively, or additionally individual fibers can be uniformly orientated and bound in a bunch using the binder of this invention to at-least partially cure groups of partially orientated fibers to achieve improved microelasticity in composite materials.

According to the present invention, the binder may be compatible with certain fibers as a concentric coating in a melt extrusion processes. In certain embodiments the binder can act as a temporary binder, coalescing a metal and/or mixed metal oxide wool prior to flash sintering. In preferred embodiments that is not the case. Without wishing to be bound by theory, in fiber chemistries where covalent bond formation with a siloxane in the binder polymer is not possible due to the absence of bond forming groups on the man-made fiber surface, for example noble metal man-made fibers, and the primary mode of adhesion to the surface is physisorption, in this case the skilled addressee will understand that a preferred embodiment for coating the fibers is that of a unified matt with substantially no gaps between the binder and filamentary material, in order to prevent the peeling or de-adhesion of the binder from the surface of man-made fiber upon dry curing.

According to one embodiment of the present invention that is particularly suitable for bonding of a non-woven structure of organic polymer fibers that can be advantageously used for roofing applications the mixture of ethylenically unsaturated monomers to be used to prepare the polymer latex comprises:

(a) 25 to 35 wt.-% of at least one aliphatic conjugated diene, preferably butadiene;
(b) 55 to 65 wt.-% of at least one aromatic vinyl compound, preferably styrene;
(c) 0.5 to 5 wt.-% of at least one ethylenically unsaturated silane bearing at least one silicon bonded hydrolysable group, preferably. γ-methacryloxypropyl trimethoxysilane;
(d) 0.1 to 6 wt.-% of at least one ethylenically unsaturated acid, preferably a combination of acrylic acid and itaconic acid;
(e1) 1 to 15 wt.-% of at least one ethylenically unsaturated nitrile, preferably acrylonitrile; and
(e2) 0.5 to 5 wt.-% of at least one amide of an ethylenically unsaturated acid, preferably methacrylamide,
preferably
(a) 28 to 32 wt.-% of at least one aliphatic conjugated diene, preferably butadiene;
(b) 57 to 63 wt.-% of at least one aromatic vinyl compound, preferably styrene;
(c) 1 to 4 wt.-% of at least one ethylenically unsaturated silane bearing at least one silicon bonded hydrolysable group, preferably γ-methacryloxypropyl trimethoxysilane;
(d) 0.1 to 5 wt.-% of at least one ethylenically unsaturated acid, preferably a combination of acrylic acid and itaconic acid;
(e1) 3 to 10 wt.-% of at least one ethylenically unsaturated nitrile, preferably acrylonitrile; and
(e2) 0.5 to 3 wt.-% of at least one amide of an ethylenically unsaturated acid, preferably methacrylamide.

According to one embodiment of the present invention that is particularly suitable for bonding of a woven structure of glass fibers that can be advantageously used for exterior insulation finishing systems the mixture of ethylenically unsaturated monomers to be used to prepare the polymer latex comprises:

(a) 35 to 45 wt.-% of at least one aliphatic conjugated diene, preferably butadiene;
(b) 50 to 60 wt.-% of at least one aromatic vinyl compound, preferably styrene;
(c) 0.5 to 5 wt.-% of at least one ethylenically unsaturated silane bearing at least one silicon bonded hydrolysable group, preferably γ-methacryloxypropyl trimethoxysilane;
(d) 0.1 to 6 wt.-% of at least one ethylenically unsaturated acid, preferably a combination of acrylic acid and itaconic acid;
(e1) 0 to 10 wt.-% of at least one ethylenically unsaturated nitrile, preferably acrylonitrile; and
(e2) 0.5 to 5 wt.-% of at least one amide of an ethylenically unsaturated acid, preferably methacrylamide,
preferably
(a) 38 to 42 wt.-% of at least one aliphatic conjugated diene, preferably butadiene;
(b) 47 to 57 wt.-% of at least one aromatic vinyl compound, preferably styrene;
c) 0.5 to 5 wt.-% of at least one ethylenically unsaturated silane bearing at least one silicon bonded hydrolysable group, preferably γ-methacryloxypropyl trimethoxysilane;
(d) 0.1 to 5 wt.-% of at least one ethylenically unsaturated acid, preferably a combination of acrylic acid and itaconic acid; and
(e2) 0.5 to 3 wt.-% of at least one amide of an ethylenically unsaturated acid, preferably methacrylamide.

Preferably, the monomer mixture does not contain ethylenically unsaturated nitriles.

In general, the polymer latex composition of the present invention can be prepared by polymerization processes which are known in the technical area, and in particular by the known latex emulsion polymerization processes, including a latex polymerization carried out with seeds (seed latex) and a latex polymerization not carried out with seed latex. Representative processes include those which are described in U.S. Pat. Nos. 4,478,974; 4,751,111; 4,968,740; 3,563,946; 3,575,913; and DE-A-19 05 256. Such processes can be adapted for the polymerization of the monomers described above. The seed latex, where used, is preferably based on a carboxylated styrene copolymer, as exemplified in WO2017164726A1. It is preferable not to use an acrylate based ex-situ seed. The method for introducing the monomers and other ingredients, such as polymerization assistants, is not particularly critical. The polymerization is then carried out under conventional conditions until the desired conversion of monomer in to polymer has been reached. Crosslinking agents and the well known adjuvants for latex polymerization, such as initiators, surfactants, bases, buffers and emulsifiers, can be used depending on requirements.

The process for the preparation of the above-described polymer latex can be performed at temperatures of from 0 to 130° C., preferably of from 60 to 130° C., particularly preferably of from 60 to 100° C., very particularly preferably of from 75 to 100° C., in the presence of no or one or more emulsifiers and one or more initiators, such as, for example, preferably sodium persulfate or ammonium persulfate. The temperature includes all values and subvalues there between, especially including 5, 10, 15, 20, 25, 30, 35, 40, 45, 50, 55, 60, 65, 70, 75, 80, 85, 90, 95, 100, 105, 110, 115, 120 and 125° C.

The manner in which the monomers are introduced to the reaction mixture is not particularly limited. The emulsion polymerization according to the present invention can accordingly be carried out for example with monomer feed in batch, pseudobatch or continuous mode. It is also possible to create an SBR based polymer where styrene and butadiene groups are present in a "block" formation, namely a

[p(Sty)-b-p(1,3-BD)]-g-MEMO with small amounts of other monomers between block formations.

Initiators which can be used when carrying out the present invention include water-soluble and/or oil-soluble initiators which are effective for the purposes of the polymerization. Representative initiators are well known in the technical area and include, for example: azo compounds (such as, for example, AIBN, AMBN and cyanovaleric acid), inorganic peroxy compounds such as hydrogen peroxide, sodium, potassium and ammonium peroxydisulfate, peroxycarbonates and peroxyborates, as well as organic peroxy compounds such as alkyl hydroperoxides, dialkyl peroxides, acyl hydroperoxides, and diacyl peroxides, as well as esters such as tertiary butyl perbenzoate and combinations of inorganic and organic initiators. Most preferred are the inorganic persulfates such as, for example, potassium persulfate, sodium persulfate and ammonium persulfate.

The initiator is used in a sufficient amount to initiate the polymerization reaction at a desired rate. In general, an amount of initiator of from 0.05 to 5, preferably of from 0.1 to 4%, by weight, based on the weight of the total polymer, is sufficient. The amount of initiator is most preferably of from 0.1 to 3% by weight, based on the total weight of the polymer. The amount of initiator includes all values and subvalues there between, especially including 0.1, 0.5, 1, 1.5, 2, 2.5, 3, 3.5, 4 and 4.5% by weight, based on the total weight of the polymer.

The above mentioned inorganic and organic peroxy compounds may be used alone or in combination with one or more suitable reducing agents as is well known in the art. Examples of such reducing agents which may be mentioned are sulfur dioxide, alkali metal disulfites, alkali metal and ammonium hydrogen sulfites, thiosulfates and dithionites, as well as hydroxylamine hydrochloride, hydrazine sulfate, iron (II) sulfate, cuprous naphthanate, glucose, sulfonic acid compounds such as sodium methane sulfonate, amine compounds such as dimethylaniline and ascorbic acid. The quantity of the reducing agent is preferably 0.03 to 10 parts by weight per part by weight of the polymerization initiator.

Surfactants or emulsifiers which are suitable for stabilizing the latex particles include those conventional surface-active agents for polymerization processes. The surfactant or surfactants can be added to the aqueous phase and/or the monomer phase. An effective amount of surfactant in a seed process is the amount which was chosen for supporting the stabilization of the particle as a colloid, the minimization of contact between the particles and the prevention of coagulation. In a non-seeded process, an effective amount of surfactant is the amount which was chosen for influencing the particle size. The surfactant may be anionic, non-ionic, cationic, amphoteric or zwitterionic in nature, most preferred are anionic or non-ionic surfactants, or combinations thereof.

Representative surfactants include saturated and ethylenically unsaturated sulfonic acids or salts thereof, including, for example, unsaturated hydrocarbonsulfonic acid, such as vinylsulfonic acid, allylsulfonic acid and methallylsulfonic acid, and salts thereof; aromatic hydrocarbon acids, such as, for example, p-styrenesulfonic acid, isopropenylbenzenesulfonic acid and vinyloxybenzenesulfonic acid and salts thereof; sulfoalkyl esters of acrylic acid and methacrylic acid, such as, for example, sulfoethyl methacrylate and sulfopropyl methacrylate and salts thereof, and 2-acrylamido-2-methylpropanesulfonic acid and salts thereof; alkylated diphenyl oxide disulfonates, sodium dodecylbenzenesulfonates and dihexyl esters of sodium sulfosuccinate, ethoxylated alkylphenols and ethoxylated alcohols; fatty alcohol (poly)ethersulfates.

The type and the amount of the surfactant is governed typically by the number of particles, their size and their composition. Typically, the surfactant is used in amounts of from 0 to 10, preferably from 0 to 5, more preferably from 0 to 3 parts by weight, based on the total weight of the monomers. The amount of surfactant includes all values and subvalues therebetween, especially including 0, 0.1, 0.5, 1, 2, 3, 4, 5, 6, 7, 8, 9 and 10 parts by weight based on the total weight of the monomer. According to one embodiment of the present invention the polymerization is conducted without using surfactants.

Various protective colloids can also be used instead of or in addition to the surfactants described above. Suitable colloids include polyhydroxy compounds, such as partially acetylated polyvinyl alcohol, casein, hydroxyethyl starch, carboxymethylcellulose, hydroxyethylcellulose, hydroxypropylcellulose, polyethylene glycol and gum arabic. The preferred protective colloids are carboxymethylcellulose, hydroxyethylcellulose and hydroxypropylcellulose.

Furthermore, the polymerization of the monomer mixture can be conducted in presence of a degraded polysaccharide (also known as dextrin). Any degraded starch can be employed. Where used, it is preferred if the degraded starch has a dextrose equivalent DE of 15 to 70 measured according to ISO 5377 (1981-12-15). The term "polysaccharide" encompasses polysaccharides and oligosaccharides. Suitable examples are glucose syrup, commercially available from e.g Cargill Deutschland GmbH, Krefeld, Germany or Roquette, Lestrem, France and other alternatives of degraded polysaccharides that can be used according to the present invention.

In general, these protective colloids are used in contents of from 0 to 10, preferably from 0 to 5, more preferably from 0 to 2, parts by weight, based on the total weight of the monomers. The amount of protective colloids includes all values and subvalues therebetween, especially including 1, 2, 3, 4, 5, 6, 7, 8 and 9 parts by weight, based on the total weight of the monomers.

Other auxiliary agents frequently used in conventional emulsion polymerization processes can also be used in the preparation of the polymer latexes of the present invention depending on requirements. Such further auxiliary agents include, without being limited thereto, pH regulators, buffer substances, chelating agents, chain transfer agents and short stopping agents.

Non-limiting examples of suitable buffer substances are for instance alkali metal carbonates and hydrogen carbonates, phosphates and pyrophosphates. Suitable chelating agents can be exemplified by alkali metal salts of ethylenediaminetetraacetic acid (EDTA) or hydroxyl-2-ethylenediaminetriacetic acid (HEEDTA). The quantity of buffer substances and chelating agents is usually 0.001-1 weight percent, based on the total amount of monomers.

Chain transfer agents may be used for controlling the average molecular weight of the polymer chains formed in the emulsion polymerization process. Non-limiting examples of suitable chain transfer agents are organic sulfur compounds such as thioesters, for example alkylthioesters such as ethyl thioacetate, propyl thioacetate, ethyl thiopropionate, lauryl thiopropionate, methyl thiobutyrate, propyl thiobutyrate; alkyl thioglycolates such as, butylthioglycolate, hexylthioglycolate, laurylthioglycolate, 2-ethylhexylthioglycolate and isooctyl thioglycolate and thiopropionates, and the like; di-mercaptans (e.g. 1,2-ethane-dithiol) and alkyl ethers such as 2-mercaptoethyl ether. Alternatively, or additionally 2-mercaptoethanol, 3-mercaptopropionic acid and $C_1$-$C_{12}$ alkyl mercaptans may be used, whereof n-dodecylmercaptan and t-dodecylmercaptan are preferred. The quantity of chain transfer agents, if present, is usually 0.05-3.0 weight percent, preferably 0.2-2.0 weight percent, based on the total amount of the monomers.

Furthermore, it can be beneficial to introduce partial neutralization to the polymerization process. A person skilled in the art will appreciate that by appropriate selections of this parameter the necessary control can be achieved.

Various other additives and ingredients can be added in order to prepare the latex composition of the present invention. Such additives include, for example: buffers, antifoams, wetting agents, thickeners, plasticizers, fillers, pigments, dispersants, optical brighteners, crosslinking agents, antioxidants, hydrophobizing agents and metal chelating agents. Known antifoams include silicone oils and acetylene glycols. Customary known wetting agents include alkylphenol ethoxylates, alkali metal dialkylsulfosuccinates, acetylene glycols and alkali metal alkylsulfates. Typical thickeners include polyacrylates, polyacrylamides, xanthan gums, modified celluloses or particulate thickeners, such as silicas and clays. Typical plasticizers include mineral oil, liquid polybutenes, liquid polyacrylates and lanolin. Preferably a high molecular weight plasticizer is not used, more preferably no plasticizer is used. Zinc oxide, titanium dioxide, aluminum hydroxide (also known as aluminum trihydroxide), calcium carbonate and clay are the fillers typically used. The hydrophobizing agent may be a fatty compound such as a C8-22 fatty acids, C8-22 fatty acid amides, C8-22 fatty acid esters with C1-8 monohydric alcohol(s), C8-22 fatty acid esters of glycol(s), C8-22 fatty acid esters of polyglycol(s), C8-22 fatty acid esters of polyalkylene glycol(s), C8-22 fatty acid esters of glycerol, C8-22 fatty acid esters of mono-, di-, or triethanolamine(s), and C8-22 fatty acid esters of monosaccharide(s). Preferably no fatty compound is used in the binder formation. The filler may, or may not act as a fire retardant component. The filler may or may not act as a pigment; colorants, dyes and pigments may be present instead of, or in addition to the filler. Preferably a nonreinforcing filler is not present in the man-made fibers fortified by a binder.

The skilled addressee will understand that to create effective curing between fibers it is preferable that the man-made fibers coated with the binder is not subjected to a subsequent coating before the siloxane curing step is used.

The binder used to fortify the textile fiber structure according to the present invention may contain additional components such as co-binders and crosslinking agents as long as these additional components do not emit formaldehyde upon curing. As a consequence, the binders to be used according to the present invention do preferably not contain any formaldehyde resins. It is particularly preferred, if the binder does not contain any additional resinous components.

In order to optimize the properties of the binder to be used according to the present invention additional components might be present. For example the binder may comprise at least one organosilane cross-linking agent for example monomeric epoxy-functional silanes, or the reaction products thereof. The at least one organosilane cross-linking agent may comprise at least one organyl group having one or more pendant functional group(s) reactive with the active hydrogen-containing functional groups of monomer(s), if present, wherein preferably the reactive functional group(s) of the organosilane cross-linking agent is/are each independently selected from epoxy, isocyanate, amino, thiol, halogen, ureido, sulfonic acid, carboxylic acid and anhydride. Wherein the at least one organosilane cross-linking agent further comprises at least one hydrolysable group capable of forming a silanol group, the at least one hydrolysable group being preferably selected from alkoxy, acyloxy or halogen. Suitable compounds are 3-glycidoxy propyl functional alkoxy silanes. But it is preferred if the binder is free of epoxy functional silanes.

Alternatively, or additionally, at-least some of the silanol containing groups may be grafted onto the latex post-polymerisation in-situ before termination/residual monomer stripping, or fed in towards the end of the polymerization where trace monomers are still present in the polymer latex, or after the exotherm peak, to create a core-shell configuration. Such a graft may comprise an ethylenically unsaturated silane bearing at least one silicon bonded hydrolysable group. This type of grafting can be effected by use of an oxidizing agent to effect a graft reaction between the ethylenically unsaturated group of the siloxane and a side chain or terminal chain unsaturated group of the SBR polymer. But, for ease of manufacture, it is preferred if the binder is free of such grafted functional silanes and it is preferred that the binder comprising a polymer latex is free of further siloxane compounds as curing additives that are not initially present in the polymer chain.

Where strong adhesion between fiber and binder is prioritized, there exists the pre-treatment of a fiber glass or silica fiber with a monomeric alkoxy silane followed by a curing step in-order to silanize the glass fiber before the binder is applied. This embodiment is less preferential.

Although it is outside the scope of this invention, the skilled addressee will understand that it is also possible to omit silanization of the polymer during copolymerization of an SBR or XSBR based polymer, and include siloxane bearing groups after termination and before or after removal of the (X)SBR based polymer from the polymerization tank, and/or before or after a residual monomer stripping step, and/or before or after resuspension of the (X)SBR based polymer in a known graft polymer technique involving oxidizing agents, an (X)SBR based polymer, and one of; ethylenically unsaturated siloxanes, amine functional siloxanes, glycidyl functional siloxanes, carboxylic acid functional siloxanes, or hydroxyl functional siloxanes. Such an approach has the disadvantage of being a multi-step process, with difficulties relating to un-selective grafting, unwanted side reactions, high reaction initiation temperatures potentially requiring other unwanted catalyzing agents present in the final composition.

In one embodiment acid or base catalysts which lower the activation energy of the hydrolysis or silanol condensation reaction may also be present. The catalysts promote the initial hydrolysis before drying of the binder. Effective catalysts may be acetic acid, mineral acids, lewis acids, tin-based catalysts, alkali metal or alkali earth metal compounds and chelating co-catalysts thereof, as disclosed in U.S. Pat. No. 6,313,253B1.

In another embodiment it is possible to use photocuring to create silane bonds from siloxanes. Typically a photoinitiator is used in combination with UV irradiation to achieve curing of the fiber matt or mesh at room temperature, in the presence or absence of an aprotic solvent. A photocuring step is typically performed in an inert atmosphere, or sub-aerobic atmosphere to prevent photocuring inhibition, such as Irgacure®819, preferably with monochromatic light of wavelength 360 nm to 380 nm. Such an embodiment is considered to be fully cured upon end of exothermic release.

A suitable surface tension for the binder according to the present invention may be in the range of 20 to 52 mN/m, preferably 23 to 45 mN/m, more preferred 25 to 42 mN/m and most preferred from 28 to 38 mN/m, measured according to ISO 1409 at 23° C. As will be appreciated by a person skilled in art the suitable surface tension can be adjusted by the addition of surfactants and/or wetting agents in the appropriate amounts to adjust the desired surface tension. Preferred surfactants or wetting agents are sodium dioctyl sulfo succinate, sodium dinonyl sulfosuccinate and an ethoxylated mixture of straight chain C9-C11 alcohols. Also, the salts of dialkyl sulfosuccinates useful in this invention are the ammonium salt and the alkali metal, particularly sodium and potassium, salts of a dialkyl ester of sulfosuccinic acid.

In the context of the present invention non-wovens are defined as in ISO standard 9092 and CEN EN 29092 as a sheet of fibers, continuous filaments, or chopped yarns of any nature or origin, that have been formed into a web by any means, and bonded together by any means, with the exception of weaving or knitting. Felts obtained by wet milling are not nonwovens.

Wet-laid webs are non-wovens provided they contain a minimum of 50% of man-made fibers or other fibers of non-vegetable origin with a length to diameter ratio equal or greater than 300, or a minimum of 30% of man-made fibers with a length to diameter ratio equal or greater than 600, and a maximum apparent density of 0.40 g/cm$^3$.

Composite structures are considered to be non-wovens provided their mass is constituted of at least 50% of non-woven as per to the above definitions, or if the non-woven component plays a "prevalent role."

Non-woven textile fiber structures according to the present invention can be suitably used as base interlinings for coated sarking, roofing and sealing membranes.

Suitable non-woven fabrics may be made from spun bond non-wovens or staple fiber webs.

Spunbonded non-wovens may be manufactured by random deposition of freshly melt-spun filaments. They consist of endless synthetic fibers made of melt-spinnable polymer materials for example polyesters in particular partially aromatic of fully aromatic polyesters. Staple fiber webs can be formed by carding, air-lay or wet-lay processes followed by web stacking by parallel-lay, cross-lay, and perpendicular-lay processes.

In both cases, the non-wovens are bonded by the binder according to the present invention to provide sufficient mechanical stability, such as good perforation strength and good tensile strength for example in processing such as bituminizing or laying. In addition, there is a need for high heat stability, and high thermo dimensional stability, for example during bituminization, or being subject to application of radiant heating. In contrast to the prior art binders, the addition of reactive thermo-set resins such as resins that emit formaldehyde upon curing are not necessary according to the present invention and are preferably avoided.

In addition to the chemical bonding, the mechanical stability can be further modified with reinforcing fibers such as glass fibers, or by composite materials, incorporated into the spunbond and staple fiber webs by knitting or stitch bond technologies, or by the use of bi-component fibers or the additional use of starches compatible with the polymer latex according to the present invention such as natural so-called native starches and modified starches, such as cationic or anionic or starch derivatives (so called chemically modified starches).

Examples of such membranes can be found in GB-A-1,517,595, EP-A-160,609, EP-A-176,847, DE-A-3,347,280, U.S. Pat. Nos. 4,472,086, 4,504,539, EP-A-0,281,643, EP 2 231 917 B1, EP-A-333,602 and EPA-A-395,548.

Another target is EIFS or ETICS systems based on woven glass fiber structures. Nevertheless, also other glass mesh systems (ETICS=External thermal insulation composite system), glass scrims, knitted scrims, glass fiber mats and glass felts max be fortified with the binder according to the present invention.

Alternatively, or additionally, the fortified fiber structure may comprise a textile fabric, typically, but not exclusively derived from glass fiber threads (yarn & roving) or filaments of any Tex range (wherein a Tex is a unit for the weight of the yarn). The glass fabric in this present description has to be understood as a glass mesh structure (woven), as a glass scrim system or as glass felt (non-woven) particularly suitable as core grids for plaster and mortar reinforcement, as screed reinforcement, support for mosaics or any for other type glass fiber reinforcement systems. Applications also include glass fiber wall papers (which may be woven and non-woven).

The common feature of these glass fabrics is the use of the binder according to the present invention, resulting in the stabilization of weave pattern, an excellent alkali resistance, ease of use by construction workers, being more resistant to mishandling, and the protection from aggressive environmental effects as well as in the fiber bonding.

The process for coating the fibers with the polymer latex can be performed to different target coat weights. The coat weight is defined as the ratio of the total weight of bone binder to the total weight of dry solid fiber, the fiber can be in an individual coated fiber or coated mesh configuration. The addressee will understand that an optimal amount is a tradeoff between mechanical properties and/or alkali resistance of the impregnated and cured fibers to the cost of the binder to achieve an effective cured textile fiber structure. The coat weight value can be above 1.0 [wt.-% dry/dry], above 2.0%, above, above 3.0%, above 4.0%, above 6.0%, above 8.0%, above 10.0%, above 12.0%, above 14.0%, above 16.0%, above 17.0%, above 18.0%, above 19.0%, above 20.0%, above 21.0%, above 22.0%, above 24.0%, above 26.0%, above 28.0%, above 30.0%, above 35.0%, above 40.0%, or above 50.0% [wt.-% dry/dry], or an even larger amount. The coat weight value can be below 100.0% [wt.-% dry/dry], below 50.0%, below 45.0%, below 40%, below 35%, below 30.0%, below 28.0%, below 26.0%, below 24.0%, below 22.0%, below 21.0%, below 20.0%, below 19.0%, below 18.0%, below 17.0%, below 16.0%, below 14.0%, below 12.0%, below 10.0%, below 8.0%, below 6.0%, below 4.0%, below 3.0%, below 2.0%, below 1.0%, or below a lower loading. The coat weight can include all values and subvalues there between.

The present invention will now be illustrated by the following examples.

EXAMPLES

Determination of Physical Parameters:

The dispersions were characterized by determination of total solids content (TSC), pH value, glass transition temperature and viscosity (Brookfield LVT).

Determination of Total Solid Contents (TSC):

The determination of total solids content is based on a gravimetric method. 1-2 g of the dispersion are weighed on an analysis balance into a tarred aluminum dish. The dish is stored for 1 hour at 120° C. in a circulating air oven until constant mass is reached. After cooling to room temperature (23° C.) the final weight is determined again. The solids content is calculated as follows:

$$TSC = \frac{m_{initial} - m_{final}}{m_{initial}} 100\%$$

$m_{initial}$ = initial weight, $m_{final}$ = weight after drying

Determination of pH Value:

The pH value is determined according to DIN ISO 976. After 2 point calibration with buffer solutions the electrode of a Schott CG 840 pH meter was immersed in the dispersion at 23° C. and the constant value on the display was recorded as pH value.

Determination of Viscosity:

The viscosities were determined at 23° C. with a Brookfield LVT viscometer. Approximately 220 ml of the liquid (freed of air bubbles) was filled into a 250 ml beaker and the spindle of the viscometer was immersed up to the mark. The viscometer is then switched on and after approximately 1 minute the value is recorded until it is constant. The viscosity range determines the choice of spindle and rotational speed and the factor for the recorded value to calculate the viscosity. The information about spindle and revolutions per minute are shown in brackets in the Table 1.

Determination of Surface Tension:

Surface tension was measured according to ISO 1409 at 23° C.

Determination of Glass Transition Temperature:

The glass transition temperature was measured according to ASTM D3418-08. Tmg is the midpoint temperature measured at a heating rate of 20° C./min.

Following abbreviations are used in the examples:
AA=acrylic acid
IA=itaconic acid
2-HEA=2-Hydroxyethyl acrylate
MAAm=meth acrylamide
B=butadiene
S=styrene
S seed=carboxylated styrene copolymer seed (including the weight of acrylic acid residue)
ACN=acrylonitrile
tDDM=tert dodecyl mercaptan
Na$_4$EDTA=tetra sodium salt of ethylenediaminetetraacetic acid
NaPS=sodium peroxodisulfate
Memo=γ-methacryloxypropyl trimethoxysilane
Emu SAS=Sodium C14-C17 secondary alkylsulfonate
EMU SDBS=Sodium dodecylbenzenesulfonate
TSC=total solid content
Tmg=Glass transition temperature, midpoint temperature
TDS Thermo dimensional stabiltiy In the following all part and percentages are based on weight unless otherwise specified.

Example 1

The polymer latex compositions were produced by a free radical polymerization combining an initial charge and a feed. A nitrogen-purged stainless steel pressure autoclave was charged with a seed in the initial charge together with a complexing agent (0.03 parts by weight of Na$_4$EDTA, 0.1 parts by weight of emulsifier, itaconic acid (if used) and water (about 65 parts by weight, based on 100 parts by weight of monomer including the seed latex). After heating the initial charge to 85° C. the polymerization reaction was initiated by starting a feed of NaPS. 5 minutes after the NaPS feed the addition of the monomers (beside meth acrylamide and itaconic acid) was started and fed over a period of 6 hours. The addition of meth acrylamide and additional emulsifier was started after 60 minutes over a period of 5 hours. Thereafter, a post activation with NaPS to reduce residual monomers was started and continued for two hours, followed by a holding phase of 1 hour at 85° C. The residual monomers were removed by vacuum distillation at 60° C. The reaction mixture was cooled to room temperature; pH value was adjusted to 6.7 by using an aqueous sodium hydroxide solution, 0.5 parts by weight of a Wingstay L type antioxidant (60% dispersion in water) and (according to table 1) 0.4 parts of a sodium dialkylsulfosuccinate based wetting agent were added. The total solid content was adjusted to 50% and sieved through a filter screen (90 µm). The properties of the prepared latices are summarized in Table 1.

For comparison representing the industrial standard described in the background section a commercial XSBR latex comprising N-methylol(meth)acrylamide residues available from Synthomer Deutschland GmbH as Litex SBV 600 was used in the comparative examples. In the latices according to the present invention N-methylolmethacrylamide is substituted by γ-methacryloxypropyl trimethoxysilane and the glass temperature is adjusted by the monomer composition to be close to the glass temperature of Litex SBV 600 of 31° C.

Impregnation of Non-Wovens for Roofing Felts:

The latices were used for the impregnation of non-wovens for bituminous roofing felts. The latices were diluted with deionized water to a TSC of 8 wt.-%. A polyester spunbond non-woven with a grammage of 158 g/m$^2$ was used for impregnation. Test pieces (32×40 cm) were impregnated by using a laboratory scale Foulard machine Type HVF 350 (3 bar, 1.5 m/minute), supplied by Mathis AG, Switzerland, the achieved coat weight was 20 wt.-% dry/dry. The coated fabric was dried on a tentering frame (Pretension 1 kP) at a temperature of 200° C. for 10 minutes.

TABLE 1

Properties of Prepared Latices and impregnated fabric

| Latex | 1/1 | 1/2 | 1/3 | 1/4 | 1/5 | 1/6 | 1/7 | 1/8 | 1/9 | 1/10 |
|---|---|---|---|---|---|---|---|---|---|---|
| AA | 1 | 2 | 1 | 1 | 1 | 1 | 1 | 1 | 1 | 1 |
| IA | 1 | 0 | 1 | 1 | 1 | 1 | 1 | 1 | 1 | 1 |
| ACN | 10 | 10 | 5 | 5 | 5 | 5 | 5 | 5 | 10 | 10 |
| B | 32 | 32 | 30 | 30 | 30 | 30 | 30 | 25 | 32 | 32 |
| MAAm | 1 | 1 | 1 | 1 | 1 | 1 | 1 | 1 | 1 | 1 |
| S | 53 | 52 | 59 | 60 | 57 | 58 | 59 | 64 | 52 | 52 |
| S seed | 1 | 1 | 1 | 1 | 1 | 1 | 1 | 1 | 1 | 1 |

TABLE 1-continued

Properties of Prepared Latices and impregnated fabric

| Latex | 1/1 | 1/2 | 1/3 | 1/4 | 1/5 | 1/6 | 1/7 | 1/8 | 1/9 | 1/10 |
|---|---|---|---|---|---|---|---|---|---|---|
| Memo | 1 | 2 | 2 | 1 | 2 | 2 | 2 | 2 | 2 | 2 |
| 2-HEA | 0 | 0 | 0 | 0 | 2 | 1 | 0 | 0 | 0 | 0 |
| tDDM | 0.5 | 0.5 | 0.2 | 0.2 | 0.2 | 0.2 | 0.4 | 0.2 | 0.2 | 0.2 |
| Emu SAS | 0.7 | 0.7 | 0.6 | 0.6 | 0.6 | 0.6 | 0.6 | 0.6 | 0.6 | 0 |
| EMU SDBS | 0 | 0 | 0 | 0 | 0 | 0 | 0 | 0 | 0 | 0.4 |
| Wetting agent | 0 | 0 | 0 | 0 | 0.4 | 0.4 | 0.4 | 0 | 0 | 0 |
| NaPS | 1.05 | 1.05 | 1.05 | 1.05 | 1.05 | 1.05 | 1.05 | 1.05 | 1.05 | 1.05 |
| Tmg DSC [° C.] | 41 | 40 | 45 | 39 | 38 | 40 | 35 | 52 | 41 | 43 |
| Surface tension [mN/m] | 38.9 | 37.6 | 38.6 | 41.6 | 28.8 | 30.3 | 30.8 | 41.4 | 39.9 | 45.1 |
| Coat weight [wt.-% dry/dry] | 19.8/19.9 | 21.8/21.6 | 21.8/21.2 | 18.7/20.8 | 20.0 | 19.9 | 20.6 | 20.5 | 22.8/22.8 | 21.4/21.3 |
| Elongation [%] | 0.70 | 0.71 | 0.65 | 0.95 | 0.35 | 0.37 | 0.47 | 0.47 | 0.74 | 0.78 |
| Shrinkage [%] | 0.46 | 0.60 | 0.59 | 0.81 | 0.49 | 0.51 | 0.52 | 0.62 | 0.60 | 0.51 |

In the case of the combination of Litex SBV 600 with a melamine formaldehyde resin 93 pph of the latex were compounded with 7 pph Madurit SMW 818 (Ineos Melamines GmbH), diluted to a TSC of 8 wt.-% by deionized water and stirred over a period of 20 minutes at room temperature.

The thermo dimensional stability of the fabrics was tested according to DIN 18192 (paragraph 5.7); Elongation and shrinkage are summarized in table 2.

TABLE 2 comparative examples

| Internal code | Litex SBV 600 | Litex SBV 600 + 7 pph Madurit SMW 818 |
|---|---|---|
| Comp example | 1 | 2 |
| Coat weight [wt.-% dry/dry] | 19.7/20.2 | 18.2/20.2 |
| TDS Elongation [%] | 1.45 | 1.0 |
| TDS shrinkage [%] | 1.70 | 0.5 |

As can be seen from the comparison between the examples according to the present invention and the comparative examples, the binders according to the present invention achieve without emitting formaldehyde upon curing the same level of thermo dimensional stability as the 2-pack (2K) binder system using in addition to the N-methylolmethacrylamide containing latex a urea formaldehyde crosslinker. The TDS elongation is even improved for many of the inventive binders. Compared to the 1-pack (1K) commercial binder the thermo dimensional stability is considerably improved when using the inventive binder.

Example 2

The polymer latex composition was produced by a free radical polymerization combining an initial charge and a feed. A nitrogen-purged stainless steel pressure autoclave was charged with a seed in the initial charge together with a complexing agent (0.03 parts by weight of Na$_4$EDTA, 0.1 parts by weight of emulsifier, itaconic acid and water (about 65 parts by weight, based on 100 parts by weight of monomer including the seed latex). After heating the initial charge to 85° C. the polymerization reaction was initiated by starting a feed of NaPS. 5 minutes after the NaPS feed the addition of the monomers (beside meth acrylamide and itaconic acid) was started and fed over a period of 6 hours.

The addition of meth acrylamide and additional emulsifier was started after 60 minutes over a period of 5 hours. Thereafter, a post activation with sodium persulfate to reduce residual monomers was started and continued for two hours, followed by a holding phase of 1 hour at 85° C. The residual monomers were removed by vacuum distillation at 60° C. The reaction mixture was cooled to room temperature; pH value was adjusted to 6.7 by using an aqueous sodium hydroxide solution, 0.5 parts by weight of a Wingstay L type antioxidant (60% dispersion in water) and 0.4 parts of a sodium dialkylsulfosuccinate based wetting agent were added. The total solid content was adjusted to 50 wt.-% and sieved through a filter screen (90 µm). The properties of the prepared latices are summarized in Table 3.

TABLE 3

Properties of Prepared Latex

| Latex | 2 |
|---|---|
| AA | 2.5 |
| IA | 1.0 |
| B | 39.0 |
| MAAm | 1.0 |
| S | 53.0 |
| S seed | 1.0 |
| Memo | 2.5 |
| tDDM | 0.5 |
| Emu SAS | 0.8 |
| NaPS | 1.05 |
| Surface tension [mN/m] | 36.7 |
| Viscosity (spindle 2, 60 rmp) [mPas] | 36.7 |
| Tmg DSC [° C.] | 9 |

For comparison representing the industrial standard described in the background section a commercial XSBR latex comprising N-methylolacrylamide residues available from Synthomer Deutschland GmbH as Litex S 10656 was used in the comparative example. In the latecis according to the present invention N-methylolacrylamide is substituted by γ-methacryloxypropyl trimethoxysilane and the glass temperature is adjusted by the monomer composition to be close to the glass temperature of Litex S 10656 of 5° C.

TABLE 4

Product viscosity ISO 1652

| product | TSC (%) | Viscosity (spindle 2, 60 rmp) [mPas] |
|---|---|---|
| Litex S 10656 | 50 | 226 |

Blocking Test:

Polymer films were prepared with a film thickness of 0.5 mm by drying at a temperature of 40° C., followed by 5 minutes at 150° C. Test pieces of 2×2 cm were cut and placed in the Fixo test device of Atlas: The films were kept at 50° C. for 1 h with a load of 5 kg. After cooling to room temperature (23° C.), the blocking behavior was evaluated: 1=no blocking, easy to separate; 6=complete blocking, no separation possible.

TABLE 5

Blocking resistance

| Product | Blocking |
|---|---|
| Litex S 10656 | 1 |
| Latex 2 | 1 |

Testing According to DIN 13496 or ETAG 004—Alkaline Resistance:

The latices were used for the impregnation of glass fibers for EIFS and the residual tensile/alkaline resistance was determined. The latices were diluted with deionized water to a TSC of 45 wt.-% before impregnation. A woven open mesh glass fiber structure (11 threads in warp direction and 10 threats in weft direction per 50 mm) was used for impregnation. Test samples with 32×40 cm in size were impregnated with the latices by using a laboratory scale Foulard machine Type HVF 350 (0.95 bar, 0.5 m/minute), supplied by Mathis AG, Switzerland. The coat weight was 15-20 wt.-% dry/dry of the weight of the final impregnated mesh. The coated glass mesh was dried on a tentering frame at a temperature of 150° C. for 5 minutes, if not mentioned differently in the table.

Mechanical properties of the impregnated mesh were determined according to the DIN 13496 or ETAG 004. The tensile strength of the test pieces before and after chemical treatment was measured in warp and weft direction. The residual tensile strength was calculated by the ratio after and before chemical treatment in %.

TABLE 6 residual tensile alkali resistance

| raw glass weight | 128 g/m2 | |
|---|---|---|
| area coat weight [wt.-% dry/dry] | 21% | |
| Test: DIN EN 13496 | | |
| | Latex 2 | Litex S 10656 |
| DIN EN 13496 warp | 85% | 84% |
| DIN EN 13496 weft | 86% | 82% |

ETAG 004 Measurement—Variation of Curing Temperature:

The residual tensile after aging for the standard drying conditions were set to 100 (2 minutes at 80° C., followed by 5 minutes at 140° C.). The residual tensile after aging with modified drying temperatures are calculated as the percentage of residual tensile in reference to curing at standard conditions (step 1: 2 minutes at 80° C. & step 2: 5 minutes at 140° C.).

TABLE 7 faster & lower temperature curing
residual tensile after aging (ETAG 004) in %, warp thread
variation on drying/curing temperature

| drying step 1 | drying step 2 | Latex 2 residual tensile* (%) | Litex S 10656 residual tensile* (%) |
|---|---|---|---|
| 2 minutes at 80° C. | none | 83 | 69 |
| 2 minutes at 80° C. | 1 minutes at 80° C. | 83 | 69 |
| 2 minutes at 80° C. | 3 minutes at 80° C. | 93 | 67 |
| 2 minutes at 80° C. | 1 minutes at 140° C. | 98 | 65 |
| 2 minutes at 80° C. | 3 minutes at 140° C. | 100 | 92 |
| 2 minutes at 80° C. | 5 minutes at 140° C. | 100 | 100 |

As can be seen from the comparison between the inventive binder and the comparative binder, the inventive binder provides lower viscosity at the same TSC, improved alkali resistance and can be cured to a sufficient level without emitting formaldehyde at lower temperature and for a shorter period of time compared to the formaldehyde emitting standard. Thereby when employing the inventive binder handling properties and process efficiency can be improved resulting in an enhanced product.

What is claimed is:

1. A textile fiber structure comprising man-made fibers fortified by a binder comprising a polymer latex obtained from the emulsion polymerization in aqueous medium of a mixture of ethylenically unsaturated monomers comprising:
   (a) an aliphatic conjugated diene;
   (b) a vinyl aromatic compound;
   (c) an ethylenically unsaturated silane bearing at least one silicon bonded hydrolysable group; and
   (d) 0.1 to 8 wt. % of at least one ethylenically unsaturated acid based on the total weight of ethylenically unsaturated monomers.

2. The textile fiber structure of claim 1, wherein the binder is free of formaldehyde emitting components, and/or wherein the polymer latex is the sole binder.

3. The textile fiber structure of claim 1, wherein the mixture of ethylenically unsaturated monomers comprises:
   (a) 20 to 60 wt.-% of at least one aliphatic conjugated diene;
   (b) 30 to 70 wt.-% of at least one aromatic vinyl compound;
   (c) 0.5 to 5 wt.-% of at least one ethylenically unsaturated silane bearing at least one silicon bonded hydrolysable group;
   (d) 0.1 to 7 wt.-% of at least one ethylenically unsaturated acid; and
   (e) 0 to 20 wt.-% of at least one further ethylenically unsaturated compound different from any of compounds (a) to (d),
the weight percentages being based on the total amount of monomers and add up to 100 wt. %;
and/or wherein
   (a) the conjugated diene is selected from 1,3-butadiene, 2,3-dimethyl-1,3-butadiene, isoprene and combinations thereof; and/or
   (b) the vinyl aromatic compound is selected from at least one of styrene, a-methyl styrene, p methylstyrene, t-butylstyrene, 2-vinyltoluene and combinations thereof; and/or
   (c) the ethylenically unsaturated silane bearing at least one silicon bonded hydrolysable group is selected from γ-(meth)acryloxypropyl trimethoxysilane, γ-(meth)acryloxypropyl triethoxysilane, γ-(meth)acryloxypropyl methyldimethoxysilane, γ-(meth)acryloxypropyl dimethylmethoxysilane, 3-(N-allylamino)propyl trimethoxysilane, allyltrimethoxysilane, allyltriethoxysilane, allylmethyldimethoxysilane, vinyltrimethoxysilane, vinyltriethoxysilane, vinylmethyldimethoxysilane and combinations thereof; and/or (d) the ethylenically unsaturated acid is selected from at least one of (meth)acrylic acid, itaconic acid, maleic acid, fumaric acid, crotonic acid, vinyl acetic acid, vinyl lactic acid, vinyl sulfonic acid, styrene sulfonic acid, acrylamidomethyl propane sulfonic acid and combinations thereof; and/or (e) the ethylenically unsaturated monomer different from the monomers a) to d) is selected from at least one of alkyl esters or hydroxy alkyl esters of (meth)acrylic acid, unsaturated nitriles, vinyl esters of carboxylic acids, amides of ethylenically unsaturated acids, vinyl compounds containing sulphonate, sulphonic acid and/or amide groups.

4. The textile fiber structure of claim 1, wherein
the man-made fibers are selected from organic polymer fibers and glass fibers, wherein the organic polymer fibers are selected from fibers comprising polyester, polyetherester, polyurethane, polybutylene terephthalate, hydroxyl functionalized polyolefins comprising (meth)acrylic acid-g-propylene, polyvinyl alcohol or it's acetals or ketals, nylon 6, nylon 66, polyethylene, polypropylene, polyarylene sulphide, polyether ether ketone, graphitic carbon, particularly activated fibrous carbon, glassy carbon fiber, graphite-epoxy blends, fullerne type carbon, acrylic fibers, modacrylic fibers, aramid or kevlar fibers, nomex fibers, spandex fibers, poly acrylonitrile, chemically modified polycarbonate fibers, chemically treated vinylidine fibers, chemically treated vinyon or saran PVC fibers, artificial polyisoprene or combinations thereof.

5. The textile fiber structure of claim 1, wherein the fiber structure is selected from non-woven structures and woven structures.

6. The textile fiber structure of claim 1, wherein the fiber is an organic polymer fiber.

7. The textile fiber structure of claim 6, wherein the mixture of ethylenically unsaturated monomers comprises:
(a) 25 to 35 wt.-% of the at least one aliphatic conjugated diene;
(b) 55 to 65 wt.-% of the at least one aromatic vinyl compound;
(c) 0.5 to 5 wt.-% of the at least one ethylenically unsaturated silane bearing at least one silicon bonded hydrolysable group;
(d) 0.1 to 6 wt.-% of the at least one ethylenically unsaturated acid;
(e1) 1 to 15 wt.-% of at least one ethylenically unsaturated nitrile; and
(e2) 0.5 to 5 wt.-% of at least one amide of an ethylenically unsaturated acid.

8. The textile fiber structure of claim 1, wherein the fiber is a glass fiber.

9. The textile fiber structure of claim 8, wherein the mixture of ethylenically unsaturated monomers comprises:
(a) 35 to 45 wt.-% of the at least one aliphatic conjugated diene;
(b) 50 to 60 wt.-% of the at least one aromatic vinyl compound
(c) 0.5 to 5 wt.-% of the at least one ethylenically unsaturated silane bearing at least one silicon bonded hydrolysable group;
(d) 0.1 to 6 wt.-% of the at least one ethylenically unsaturated acid;
(e1) 0 to 10 wt.-% of at least one ethylenically unsaturated nitrile; and
(e2) 0.5 to 5 wt.-% of at least one amide of an ethylenically unsaturated acid.

10. The textile fiber structure of claim 1, wherein the binder has a surface tension of 20 to 52 mN/m, measured according to ISO 1409 at 23° C.

11. The textile fiber structure of claim 6, wherein the fiber is a polyester fiber.

12. The textile fiber structure of claim 7, wherein the at least one aromatic vinyl compound comprises styrene.

13. The textile fiber structure of claim 7, wherein the at least one ethylenically unsaturated acid comprises acrylic acid, itaconic acid, or a combination thereof.

14. The textile fiber structure of claim 7, wherein the at least one ethylenically unsaturated nitrile comprises acrylonitrile.

15. The textile fiber structure of claim 7, wherein the at least one amide of an ethylenically unsaturated acid comprises (meth)acrylamide.

16. The textile fiber structure of claim 8, wherein the glass fiber comprises a sizing.

17. The textile fiber structure of claim 9, wherein the at least one aliphatic conjugated diene comprises butadiene.

18. The textile fiber structure of claim 9, wherein the at least one aromatic vinyl compound comprises styrene.

19. The textile fiber structure of claim 10, wherein the binder has a surface tension of 23 to 45 mN/m.

20. The textile fiber structure of claim 10, wherein the binder has a surface tension of 28 to 38 mN/m.

* * * * *